United States Patent [19]
Shreckhise

[11] 3,993,026
[45] Nov. 23, 1976

[54] POULTRY COOP
[76] Inventor: George W. Shreckhise, Weyers Cave, Va. 24486
[22] Filed: May 28, 1975
[21] Appl. No.: 581,669

Related U.S. Application Data
[63] Continuation-in-part of Ser. No. 571,697, April 25, 1975.

[52] U.S. Cl. .................................. 119/19; 217/57
[51] Int. Cl.² ...................................... A01K 31/07
[58] Field of Search .......................... 119/17–22; 217/57, 42

[56] References Cited
UNITED STATES PATENTS
689,397   12/1901   Hodges .................................. 119/19
2,109,902  3/1938   Hatch et al. ........................... 217/57
2,238,676  4/1941   Brewster ............................... 119/19
3,095,992  7/1963   Shreckhise ............................ 217/57
3,621,818  11/1971  Johnson et al. ........................ 119/12

Primary Examiner—Robert Peshock
Assistant Examiner—Peter K. Skiff
Attorney, Agent, or Firm—Sherman Levy

[57] ABSTRACT

A poultry coop is provided that has a full length, half-top, non-bruise loading door. The poultry coop also includes a full-width and length non-bruise self-dumping side door. The poultry coop is especially useful for squeeze lift operations and automatic conveyor and self-dumping operations for poultry handling.

3 Claims, 10 Drawing Figures

U.S. Patent  Nov. 23, 1976  Sheet 1 of 3  3,993,026
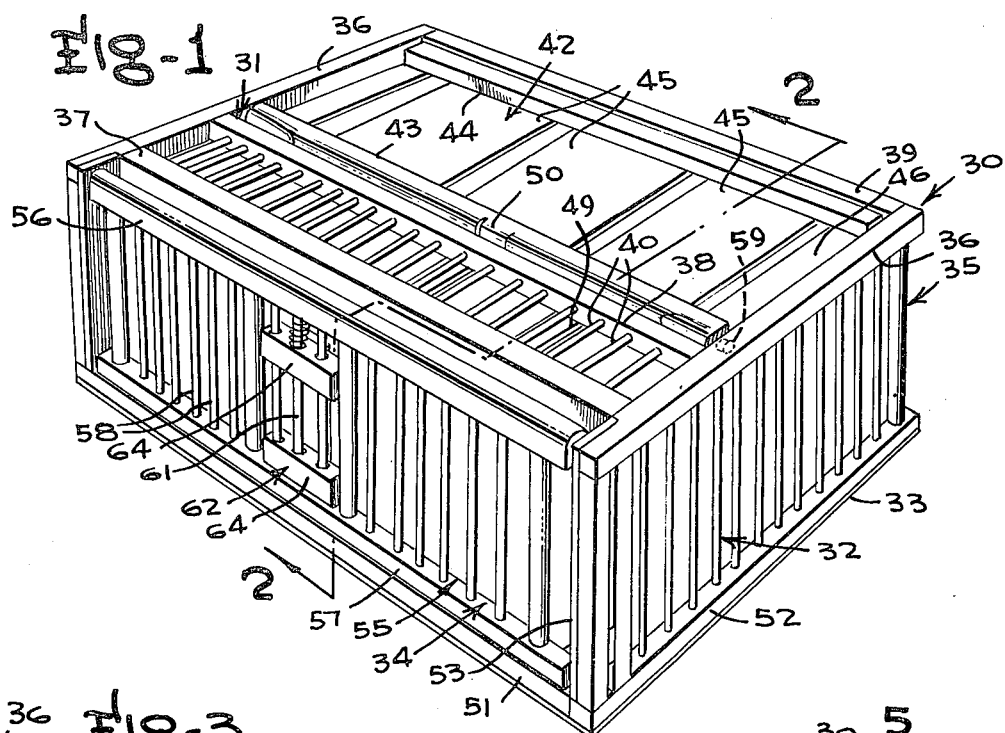
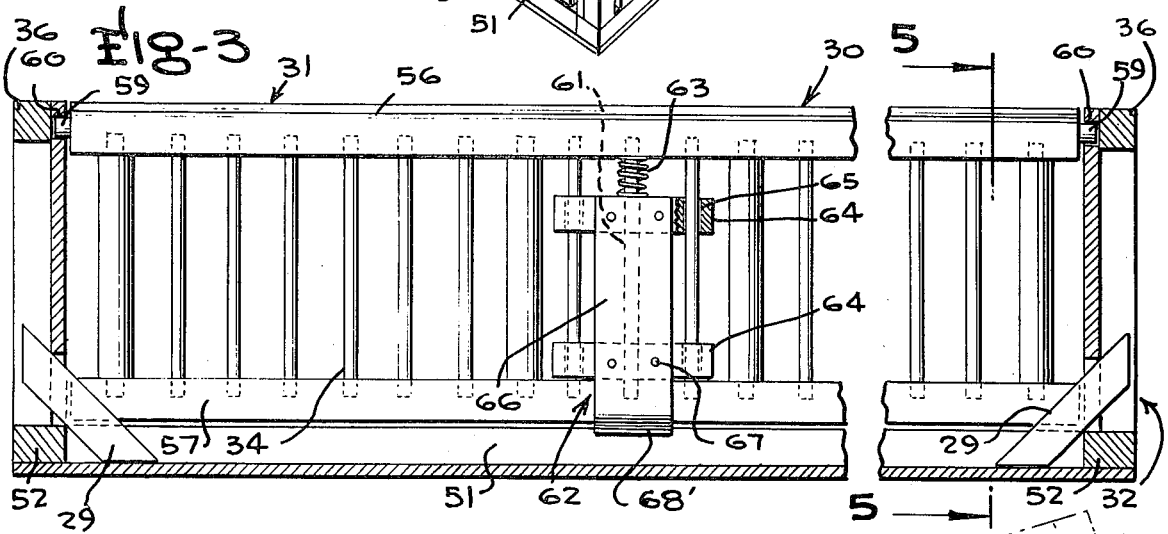
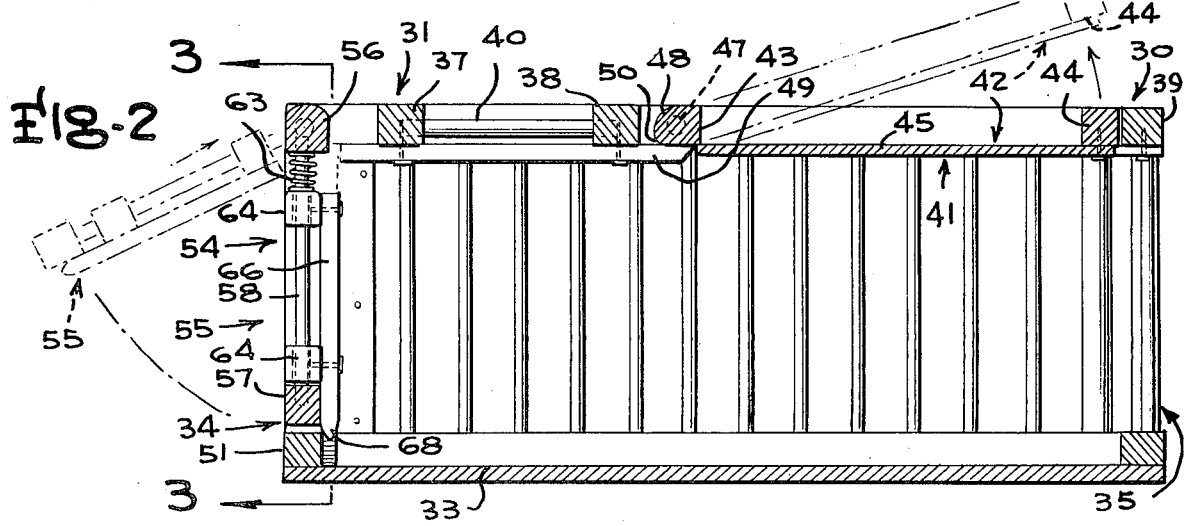

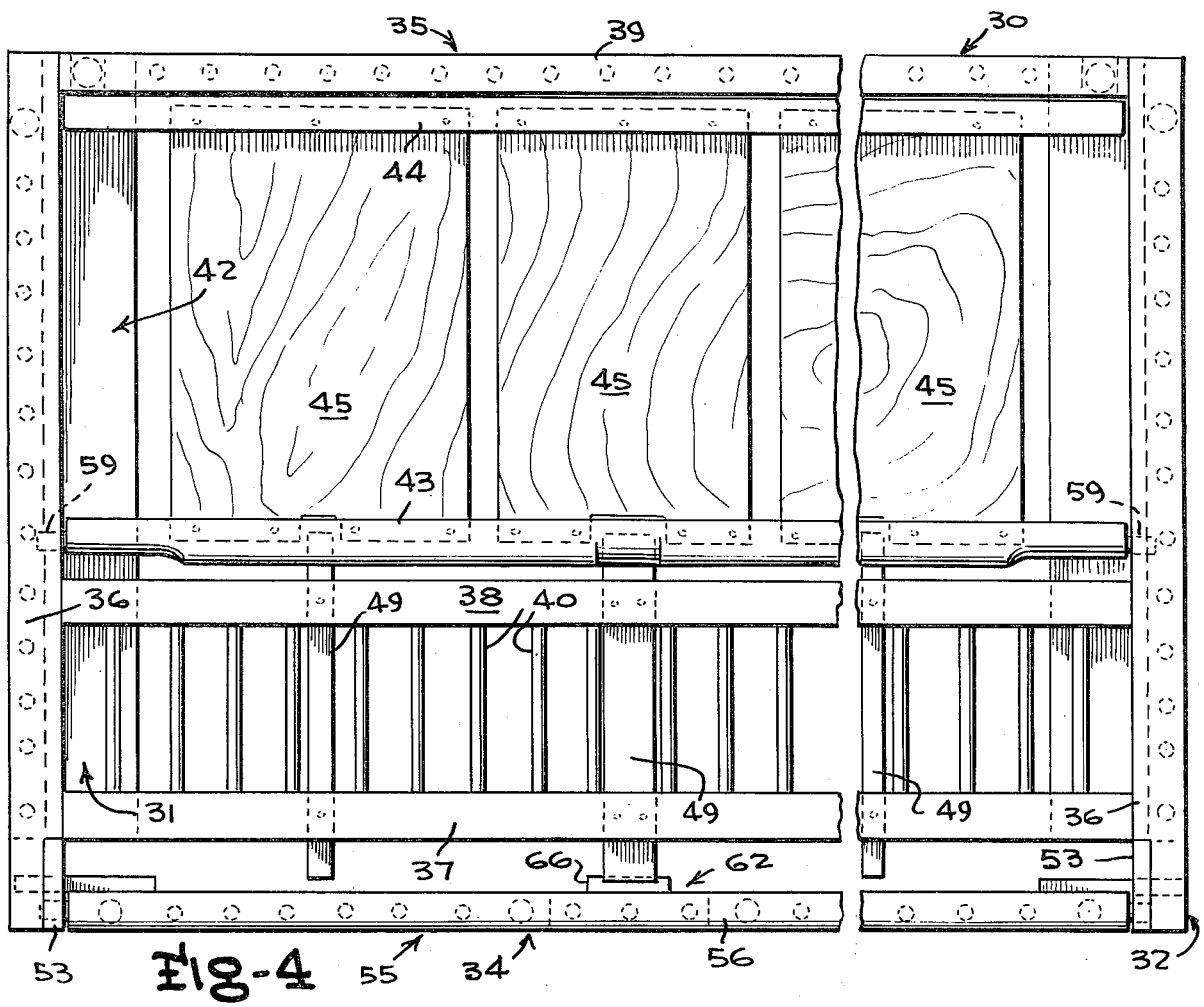
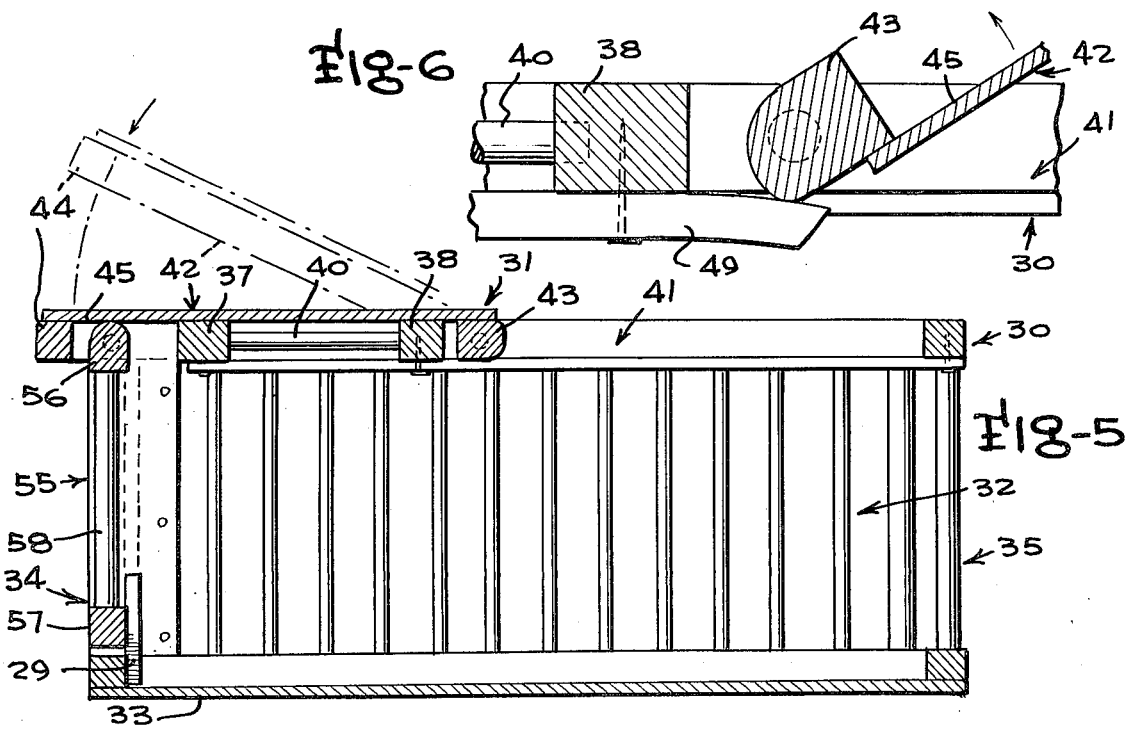

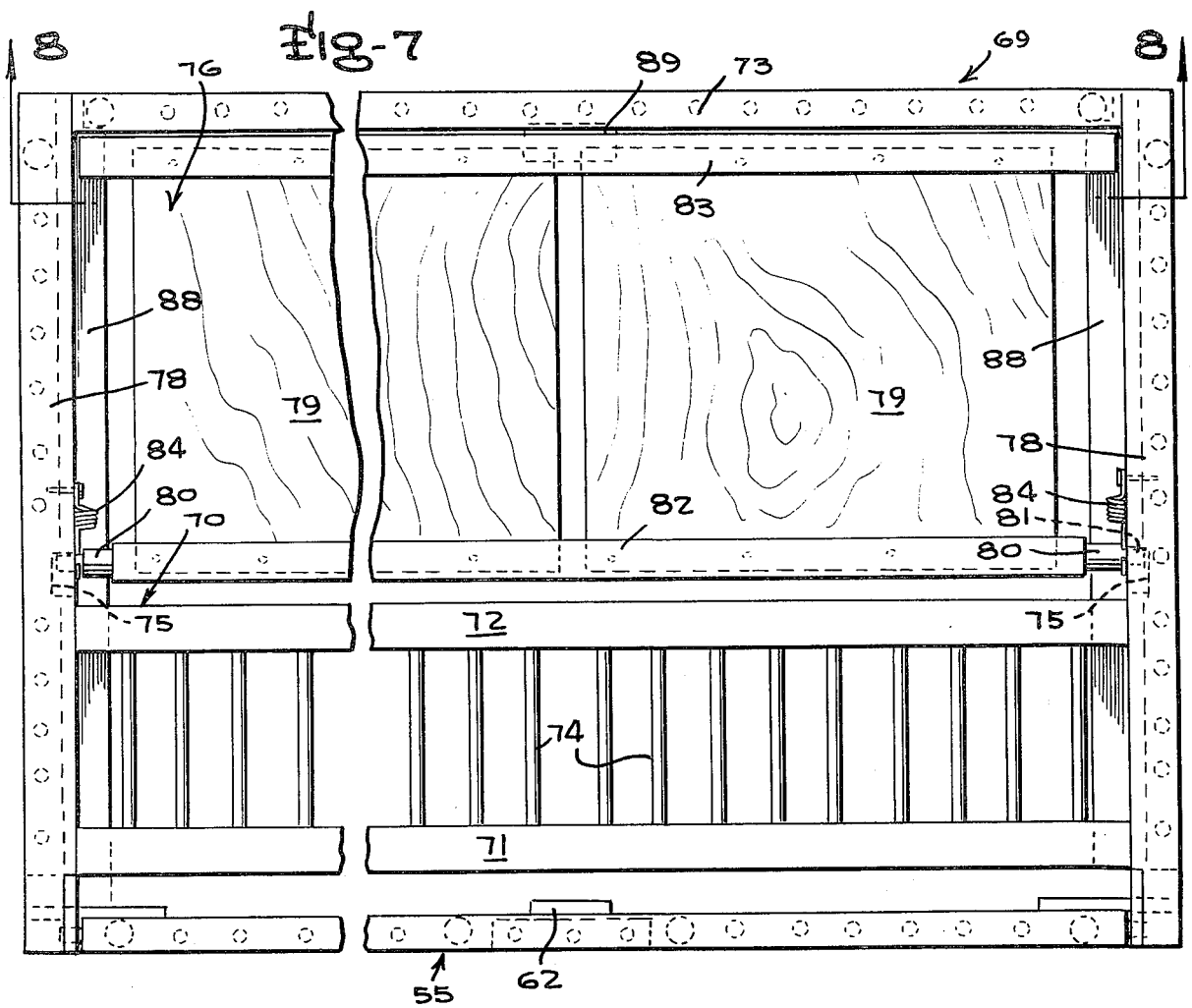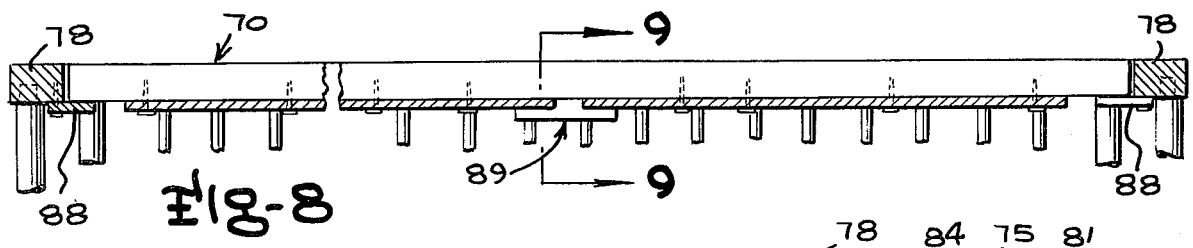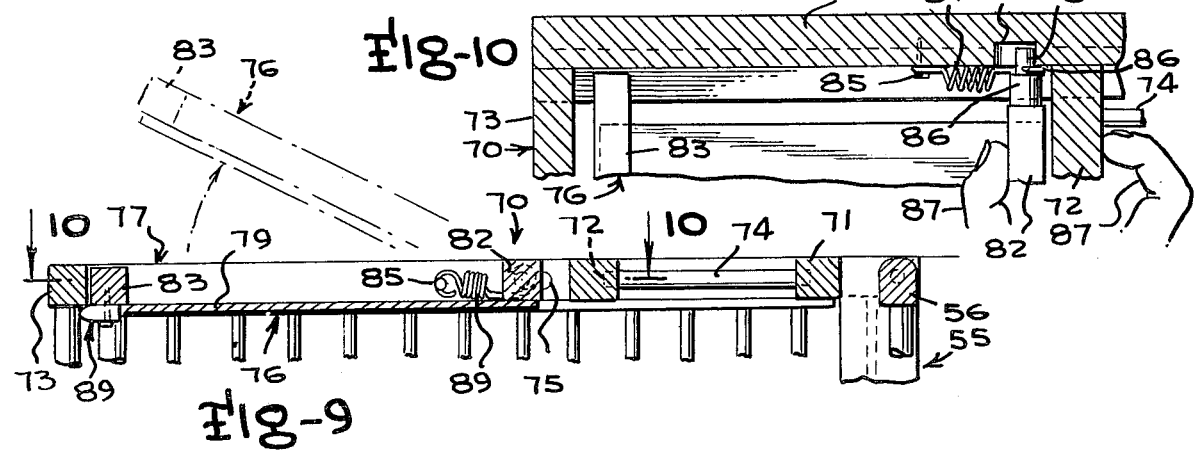

POULTRY COOP

BACKGROUND OF THE INVENTION

The present invention is an improvement and continuation-in-part of prior patent application filed April 25, 1975, Ser. No. 571,697.

FIELD OF THE INVENTION

The present invention relates to a poultry coop for handling chickens or other fowl and wherein there is provided a full length, half-top, non-bruise loading door. There is also provided on the poultry coop a full width and length non-bruise self-dumping side door. The poultry coop is especially suitable or advantageous for squeeze lift operations and automatic conveyor and self-dumping operations when handling large quantities of poultry such as chickens and the like.

SUMMARY OF THE INVENTION

There is provided a poultry coop with a full-lenth, half-top, non-bruise loading door as well as a full width and length non-bruise self-dumping side door. Heretofore, poultry coops have been provided with a relatively small door on the top thereof and such small doors were disadvantageous because parts of the chickens or other fowl had a tendency to catch on the portion of the poultry coop adjacent the small door opening. Whereas, with the present invention, there is provided a full length, half-top loading door that permits a person to reach in for chickens if desired and wherein the additional space provides additional clearance for loading the chickens into the coop without bruising the chickens. In addition, the coop of the present invention is constructed so that the chickens will not be smothered. Further, the top door of the coop of the present invention is constructed so that when the top door is moved to its full open position the top door will lie flat or flush so that a plurality of coops can be stacked one on top of the other without breaking the parts inasmuch as the top door is fluch with the upper surface of the coop instead of being arranged at an angle with respect to the top of the coop.

In addition, there is also provided other important features such as a cam and latch mechanism that assures that the parts will move or assume the proper position and wherein the poultry coop of the present invention is constructed so that automatic unloading of the chickens at a slaughter house can be readily and efficiently accomplished.

A still further object of the present invention is to provide a poultry coop which may be readily and economically manufactured without departing from the standard construction methods and wherein the poultry coop is of a rugged and efficient construction.

Additional objects and features of the invention will appear from the following descriptions in which the preferred embodiment has been set forth in detail in conjunction with the accompanying drawings.

BRIEF DESCRIPTION OF THE DRAWINGS

FIG. 1 is a perspective view of the poultry coop of the present invention with the half-width, full length, top door and full width and length self-dumping side door.

FIG. 2 is a sectional view taken on the line 2—2 of FIG. 1.

FIG. 3 is a sectional view taken on the line 3—3 of FIG. 2.

FIG. 4 is a top plan view of the coop.

FIG. 5 is a sectional view taken on the line 5—5 of FIG. 3 with the top door fully opened.

FIG. 6 is a partial sectional view showing the cam action at the pivotal hinge point on the half width, full lenth, top door.

FIG. 7 is a top plan view of the coop having an alternative spring urged top door and illustrating a modification.

FIG. 8 is a sectional view taken on the line 8—8 of FIG. 7.

FIG. 9 is a sectional view taken on the line 9—9 of FIG. 8.

FIG. 10 is a sectional view taken on the line 10—10 of FIG. 9 with the top door urged forward against the spring in position to be swung to the open position.

DESCRIPTION OF THE PREFERRED EMBODIMENT

Referring in detail to the drawings and more particularly to FIGS. 1–6 of the drawings, the numeral 30 indicates the poultry coop of the present invention that includes a top 31, ends 32, a bottom 33 that may be made of solid plywood, FIG. 2, and first and second sides 34 and 35. The top 31 includes a pair of spaced, parallel end pieces 36; and first, second and third spaced parallel cross pieces 37, 38 and 39 extend between the end pieces 36 and are secured thereto, FIG. 1.

A plurality of dowels 40 extend between the first and second cross pieces 37 and 38 and are secured thereto as shown in the drawings.

The second and third cross pieces 38 and 39 are spaced from each other whereby there is defined and provided an enlarged door opening 41, FIG. 5, and the door opening 41 extends the full length and approximately one-half of the top.

A door 42 is mounted for movement into and out of open and closed relation with respect to the top door opening 41. The top door 42 includes first and second bars 43 and 44 that are arranged in spaced parallel relation with respect to each other. A plurality of spaced apart flat members 45 made of plywood or the like extend between the first and second bars 43 and 44 and are secured thereto. Horizontally disposed stop members 46 extend between the lower surfaces of the first, second and third cross pieces 37, 38 and 39 and are secured thereto. The second bar 44 of the door 42 is adapted to abut the stop members 46 when the door is in fully closed position as shown in FIG. 1, for example.

Diametrically opposed recesses 47 are arranged in the inner surfaces of the end pieces 36, and reduced diameter pivot pegs are arranged on the outer ends of the first bar 43. The pivot pegs 48 are swivelly mounted in the recesses 47 so that a pivot mounting is provided for the door 42.

Spaced parallel support pieces 49 are secured below the first and second cross pieces 37 and 38. The support pieces 49 have end portions projecting beyond the second cross piece 38. The first bar 43 of the top 42 has arcuate cam surfaces 50 that fixedly engage the projecting ends of the support pieces 49.

The first side 34 of the poultry coop includes a horizontally disposed base piece 51 that extends between base elements 52 and is secured thereto. Vertically disposed spaced parallel end elements 53 are secured in cut out portions in the end pieces as shown in FIG. 1.

The numeral 54 indicates a full length and full width door opening that is defined and provided in the side 34 of the coop. A full length, full width side door 55 is mounted for movement into and out of closed relation with respect to the opening 54, FIG. 2. The door 55 comprises first and second spaced parallel rails 56 and 57, and a plurality of spaced parallel dowels 58 extend between the rails 57 and 58 and are secured thereto. Pivot pegs 59 on the outer ends of the first rail 56 are swively arranged in engagement with recesses 60 in the end elements 53, FIG. 3. The numeral 61 indicates the center dowel for the door 55, and a latch 62 is provided on the intermediate portion of the door 55. A coil spring 63 is circumposed on the center dowel 61, and a pair of spaced parallel blocks 64 has openings 65 therein for slidably engaging the center dowel as well as the adjacent dowels. One of the locks 64 engages or abuts the coil spring 63. The latch piece 66 extends between the pair of blocks 64 and is secured thereto as at 67. Inclined cam surfaces 68 are provided on the free end of the latch piece 66 for selectively engaging the base piece 51. Stop elements 29 are secured to the base piece 51 and to said end elements 53 for engagement by the rail 57 of the door 55. This construction will assure that the latch 62 will selectively maintain the side door 55 in closed position; and whereby when the coop 30 is tilted in a slaughter house or the like as shown and described in my prior pending patent application, the weight of the chickens will cause the door 55 to automatically open so that the chickens will come out through the door opening 54.

Referring now to FIGS. 7, 8, 9 and 10 of the drawings, there is illustrated a alternative or modified poultry coop that is indicated generally by the numeral 69 and wherein the coop 69 includes a top 70 that comprises spaced parallel end pieces 78. First, second and third cross pieces 71, 72, and 73 extend between the end pieces 78 and are secured thereto. Spaced parallel dowels 74 extend between the first and second cross pieces 71 and 72 and are secured thereto, FIG. 7. There is provided for the coop 69 an enlarged, full length approximately one-half width top door opening 77 that is defined and provided between the second and third cross pieces 72 and 73. Recesses or elongated slots 75 are provided in the inner surfaces of the end pieces 78, FIG. 10. A full length, approximately one-half width door 76 is mounted for movement into and out of open and closed relation with respect to the opening 77. The door 76 includes first and second spaced parallel bars 82 and 83. The bar 82 has reduced diameter end portions 80, and pivot pegs 81 are formed or provided on the outer ends of the bar 82 for slidably and swively engaging the slots 75. Coil springs 84 have one end anchored in place as at 85, and the other ends of the springs 84 engage the pivot pegs 81 as at 86, FIG. 10.

Also, in FIG. 10, the numeral 87 indicates fingers of the user's hand that can be used for applying manual pressure to the parts in order to selectively open the door 76 in the top of the coop. Flat members made of plywood or the like and indicated by the numerals 79 extend between the bars 82 and 83 and are secured thereto. Stop members 88 are provided for limiting closing movement of the door 76.

It is to be understood that the coop 69 can also be provided with a self-dumping, full length, full width, side door 55 that has a latch 62, FIG. 7, and the side door 55 is adapted to be operated in the same manner as the previously described side door 55 of FIGS. 1–6.

From the foregoing, it will be seen that there has been provided a poultry coop with a full length, half top, non-bruise loading door 42 or 76. In addition, the poultry coop has a full width and length non-bruise self-dumping side door 55. The poultry coop of the present invention is especially suitable for squeeze lift operations and automatic conveyor and self-dumping operations of poultry.

In use with the parts arranged as shown in the drawings and in particular as shown in FIGS. 1–6 of the drawings, the coop 30 includes the door 42 in the top thereof. It will be seen that the door 42 extends the full length of the coop 30 and also the door 42 covers approximately one-half of the top of the coop. Thus, by moving the door 42 to open position, a large opening 41 is provided as shown in FIG. 5 and this large opening 41 permits chickens and the like to be loaded into the coop 30 without bruising the chickens. Thus, by providing such a large opening 41, injury or bruising of the chickens that heretofore has taken place due to the use of a small opening in the top of the coop is prevented. Also, as shown in FIG. 5, when the top closure or door 42 is moved to fully opened position, the door 42 will lie flat or flush with the upper surface of the coop so that a plurality of coops can be stacked one on top of the other without breaking the parts. Thus, in certain previous coops, the top door remains in a tilted or angular position when opened so that if coops are stacked one on top of the other with such a tilted top door, the parts can easily break and this problem is overcome with the present invention.

In addition, the coop 30 includes the full width and length, non-bruise, self-dumping side door 55. When the door 55 opens, an enlarged opening 54 is provided so that the chickens can be discharged from the coop without bruising or injurying the chickens as is the case when smaller openings are provided or used. Further, the door 55 is constructed so that when the coops are used in automatic poultry handling plants or facilities, and with the coops loaded with chickens, when the coops are tilted, the weight of the chickens against the door 55 will cause the door 55 to automatically open so that the door 55 will move from the solid line position of FIG. 2 to the broken line position of FIG. 2 whereby the chickens can be automatically discharged or dumped from the coops onto a conveyor or the like.

The door 42 is maintained in its closed position due to the construction of the parts. When it is desired to open the door 42, it is only necessary to manually grip the door 42 and pivot the door 42 about an axis extending through the pivot pegs 48 whereby the door 42 can be moved from a closed position such as that shown in FIG. 1 to an open position such as that shown in FIG. 5. The door 42 includes the bar 43 that has the portions 50 that remain in constant frictional engagement with the members or pieces 49 whereby sufficient pressure is exerted on the parts to retain the door either in closed or open position or else the door 42 will be maintained stationary in any intermediate position desired. Then, when sufficient slight manual pressure is applied to the door 42, the door 42 can be pivoted or swung to any other desired position.

The latch 62 for the side door 55 helps retain or maintain the door 55 in its closed position. When it is desired to manually open the door 55, it is only necessary to manually engage the blocks 64 and move the latch 62 so that the spring 63 is compressed whereby the cam 68 will move free or clear of the base piece 51 so that the door 55 can pivot about an axis extending through the pivot pegs 59.

The door 42 can pivot about an axis extending through the pivot pegs 48.

In the modified or alternative form of construction shown in FIGS. 7–10, the coop 69 includes the top 70 that has the coil springs 84 connected thereto. The coil springs 84 have a tendency to normally urge or bias the door 76 in a direction towards the piece 73. Then, as shown in FIG. 10, when it is desired to open the door 76, manual pressure can be exerted on a member such as the member 82 to extend the spring 84 and cause the pivot pegs 81 to move longitudinally in the slots 75 so that the member 83 can clear the member 73 and the latch 89 shown in FIG. 7 will permit the door 76 to open. The latch 89 functions in conjunction with the springs 84 to help maintain the door 76 in its closed position.

The coop 69 is adapted to have a full width and length non-bruise self-dumping side door 55 that has a construction and function similar to that described in connection with the form of the invention shown in FIGS. 1–6.

It is to be understood that the parts can be made of any suitable material and in different sizes or shapes as desired or required.

Also, the present invention can utilize replaceable doors. Spring latches can be provided for the doors as shown in the drawings. A cam action can also be utilized. The crate or coop has a top door that opens to lie flush as shown in FIG. 5. The side door can open to expose the full side of the coop. The parts, such as the sides, are strong or rugged in construction so that the coop will accommodate a squeeze lift for loading. The coop is strong or durable and will give or provide long periods of usage without breakage. The parts are constructed so that cooping operations will be speeded up and wherein costly bruising will be eliminated. The doors are self-latching and the side door opens automatically for self-dumping when the coop is tilted. The present invention is especially suitable for use with squeeze lifts. Also, the coop is especially suitable for use with overhead cranes and the like. The doors can be easily opened and a positive locking arrangement is provided.

The present invention prevents bruising of wings of chickens and the like since there is provided the enlarged openings in the top and sides of the coop so that the chickens can be readily loaded into and removed from the coop without bruising or injurying the chickens. Further, the top door lies flush as shown in FIG. 5 so that the top will not break if other coops are placed on top of a particular coop. Further, by having the enlarged openings, an increased amount of space is provided for a person to reach in for the chickens. Smothering of chickens will be prevented. With previous coops that have small door openings, chicken wings have a tendency to get caught in the door or opening. This is eliminated with the present invention.

A lift can be used for handling the coops. The tension of the springs 84 can be adjusted as desired.

Although the invention has been illustrated and described with reference to the preferred embodiments thereof, I wish to have it understood that it is in no way limited to the details of such embodiments, but is capable of numerous modifications within the scope of the appended claims.

What is claimed is:

1. A poultry coop, comprising a top including spaced parallel end pieces, first, second and third cross pieces extending between said end pieces and secured thereto, spaced parallel dowels extending between said first and second cross pieces and secured thereto, there being a full length approximately one-half width top door opening in said top defined and provided between said second and third cross pieces, there being elongated slots in the inner surfaces of said end pieces, a full length one-half width door mounted for movement into and out of open and closed relation with respect to said door opening, and said door including first and second bars, flat members extending between said bars and secured thereto, said first bar having reduced diameter end portions, pivot pegs on the reduced diameter end portions swivelly and slidably engaging said slots, coil springs having one end anchored to said end piece and said coil springs connected to said pegs, stop members secured to said end pieces for limiting closing movement of said door, and a latch member for said door operatively connected to said coop.

2. The structure as defined in claim 1 and further embodying a full length full width non-bruise self dumping side door operatively connected to said coop.

3. A poultry coop comprising a top, ends, a bottom, first and second sides, said top including a pair of spaced parallel end pieces, first, second and third spaced parallel cross pieces extending between said end pieces and secured thereto, a plurality of dowels extending between said first and second cross pieces and secured thereto, said second and third cross pieces being spaced from each other whereby there is defined and provided an enlarged door opening that extends the full length and approximately one-half the width of the top, a top door mounted for movement into and out of open and closed relation with respect to said top door opening, said top door including first and second bars, flat members secured to said bars, horizontally disposed stop members extending between the lower surfaces of said first second and third cross pieces and secured thereto, the second bar of said door abutting said stop members when the door is in fully closed position, there being recesses in said end pieces, pivot pegs in the outer ends of said first bar of the door swivelly mounted in said recesses, spaced apart support pieces secured below said first and second cross pieces and said support pieces having end portions projecting beyond the second cross piece, the first bar of said top having arcuate cam surfaces frictionally engaging projecting end portions of the support pieces; said first side including a horizontally disposed base piece, vertically disposed end elements secured to said end pieces, there being a full length and full width door opening defined and provided in the first side of the coop, a full length full width side door comprising first and second rails having dowels connected therebetween, pivot pegs on the outer ends of said first rail swivelly engaging recesses in said end elements, a center dowel mounted centrally on said side door and having a coil spring circumposed thereon, and said coil spring abutting said first rail, a pair of blocks having openings therein slidably mounted on said center dowel and slidably mounted on the adjacent dowels of said side door, one of said blocks abutting said coil spring, a latch piece extending between said pair of blocks and secured thereto, inclined cam surfaces provided on the free end of said latch piece for selectively engaging said base piece, stop elements secured to said base piece for selective engagement by the second rail of said side door, and whereby when the coop is moved to a tilted position, the weight of the poultry in the coop will cause the side door to automatically open so that the poultry can be automatically discharged from the coop.

* * * * *